US012762110B2

(12) United States Patent
Thunuguntla et al.

(10) Patent No.: US 12,762,110 B2
(45) Date of Patent: Oct. 13, 2026

(54) DATA REPAIR BASED ON PARITY DETERMINED USING JOIN OPERATION

(71) Applicant: Intuit Inc., Mountain View, CA (US)

(72) Inventors: Saikiran Sri Thunuguntla, Bengaluru (IN); Tal Sharon, Tel-Aviv (IL); David Zaltsman, Kiryat-Gat (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/990,869

(22) Filed: Dec. 20, 2024

(65) Prior Publication Data

US 2026/0178563 A1 Jun. 25, 2026

(51) Int. Cl.
*G06F 16/23* (2019.01)
*G06F 16/21* (2019.01)

(52) U.S. Cl.
CPC ........ *G06F 16/2365* (2019.01); *G06F 16/217* (2019.01)

(58) Field of Classification Search
CPC ........................... G06F 16/2365; G06F 16/217
See application file for complete search history.

(56) References Cited

U.S. PATENT DOCUMENTS 10,216,820 B1 * 2/2019 Holenstein ............. G06F 3/065
10,459,760 B2 10/2019 Scheuer
11,023,493 B2 6/2021 Xiang et al.
12,282,465 B1 4/2025 Thunuguntla
2006/0053139 A1 3/2006 Marzinski et al.
2011/0213923 A1 9/2011 Ledford
2012/0210189 A1 8/2012 Sugihara et al.
2013/0125129 A1 5/2013 Chakravorty et al.
2020/0081899 A1 * 3/2020 Shapur .................. G06F 16/211
2020/0364240 A1 * 11/2020 Martin .................. G06F 16/273
2021/0011891 A1 * 1/2021 Soza ....................... G06F 16/23
2021/0326359 A1 * 10/2021 Upton ..................... G06F 3/065
2022/0012188 A1 1/2022 Durham et al.
2022/0019367 A1 1/2022 Freilich et al.
2023/0409535 A1 * 12/2023 Kashi Visvanathan ...................... G06F 11/1417
2023/0412375 A1 * 12/2023 Bisht ................... G06F 11/1417
2024/0004898 A1 * 1/2024 Bindal ................ G06F 11/1451
2024/0281413 A1 * 8/2024 Kashi Visvanathan ...................... G06F 11/1417
2025/0086180 A1 3/2025 Kavalakuntla
2025/0328526 A1 10/2025 Nandi et al.

(Continued)

FOREIGN PATENT DOCUMENTS

CN 116069864 A 5/2023

*Primary Examiner* — Huawen A Peng
(74) *Attorney, Agent, or Firm* — Paradice & Li LLP

(57) ABSTRACT

Systems and methods for repairing data based on parity between an append only source database and a materialized version of the data in a target database. A data quality management (DQM) system generates a target data change dataset for target data based on changes that occurred between the current time of data ingestion and a previous time. A source data change dataset is generated for the source data based on changes that between the current and previous times. The comparison target data change dataset and source data change dataset may be used to generate parity data for updated and inserted data. Parity data is generated for the deleted data by performing a join operation using the target database and the source data change dataset. Target data is selectively repaired based on the parity data.

22 Claims, 4 Drawing Sheets

(56) References Cited

U.S. PATENT DOCUMENTS

| | | | |
|---|---|---|---|
| 2026/0023570 | A1 | 1/2026 | Thunuguntla et al. |
| 2026/0023625 | A1 | 1/2026 | Thunuguntla et al. |

* cited by examiner

DATA REPAIR BASED ON PARITY DETERMINED USING JOIN OPERATION

TECHNICAL FIELD

This disclosure relates generally to intelligent data repair, and specifically to using a data quality management (DQM) system in conjunction with an advanced DQM algorithm to selectively repair changes to data.

DESCRIPTION OF RELATED ART

As organizations have increasingly relied on the accuracy of their data, quality assurance and data management have become increasingly important. For example, artificial intelligence (AI)-driven platforms aim to enable their experts to generate meaningful insights and decisions, and the quality of their insights and decisions depends greatly on the integrity of their datasets. Managing the accuracy of the data is important to ensure that the data being relied upon is accurate, consistent, reliable, and fit for its intended uses.

Managing the accuracy of data becomes even more challenging when dynamic data sources are involved, such as news feeds, social media, sensor networks, and transaction events. During replication procedures that copy such data to centralized repositories for analytical use (e.g., DataLakes), the constantly changing transactional source data frequently results in errors and inconsistencies, such as incorrect values, missing information, duplicates, or format discrepancies ("data issues"). Such data issues often require identification and correction, e.g., via various parity procedures. However, source data and the target data may be stored in different manners, which makes determining parity between challenging for conventional Data Quality Management (DQM) systems.

Without a reliable method for determining parity in instances where the source data and target data are stored differently, efforts to detect and correct inaccuracies (e.g., in the target data) will be hindered resulting in inefficiencies and data corruption. What is needed is a system that can determine parity between in such instances.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

As discussed herein, a data quality management (DQM) system is configured to detect errors and repair data during replication of the data between an append only source database and a materialized target database. The system generates a target data change dataset for target data in the target database based on changes that occurred between the current time of data ingestion and a previous time. The target data change dataset identifies all data inserted or updated between the previous and current times, but does not necessarily identify all data that was deleted. The system generates a source data change dataset for the source data from the source database, which identifies all data inserted, updated, or deleted between the current and previous times. Differential data is generated for inserts and updates by comparing the target data change dataset and the source data change dataset. A join operation using the target database and the source data change dataset may be used to generate differential data for deletes. Based on the differential data, target data may be selectively repaired when errors are present.

One innovative aspect of the subject matter described herein can be implemented in a method for intelligently repairing data. The method includes receiving a transmission over a communications network from a computing device associated with the DQM system. The transmission includes an indication that source data stored in one or more source databases, which are append only, was ingested and stored as target data in one or more target databases in a materialized view at a current time of ingestion. Parity data is generated for the target data in the one or more target databases with the source data in the one or more source databases. The parity data is generated by generating a target data change dataset for the target data in the one or more target databases based on changes to target data that occurred from a previous time of ingestion to the current time of ingestion, wherein changes comprises updates, inserts, and deletes. A source data change dataset is generated for the source data from the one or more source databases based on changes to the source data that occurred from the previous time of ingestion to the current time of ingestion. First differential data is generated for updates and inserts based on a comparison of the updates and the inserts in the target data change dataset and the source data change dataset. Second differential data is generated for deletes based on a join operation for deletes using the one or more target databases and the source data change dataset. The target data in the one or more target databases is selectively repaired based on the first differential data and the second differential data.

One innovative aspect of the subject matter described herein can be implemented as a system for intelligently repairing data. The system includes one or more processors of a data quality management (DQM) system, and at least one memory coupled to the one or more processors and storing instructions that, when executed by the one or more processors, cause the system to perform operations. Example operations include receiving a transmission over a communications network from a computing device associated with the DQM system. The transmission includes an indication that source data stored in one or more source databases, which are append only, was ingested and stored as target data in one or more target databases in a materialized view at a current time of ingestion. Parity data is generated for the target data in the one or more target databases with the source data in the one or more source databases. The parity data is generated by generating a target data change dataset for the target data in the one or more target databases based on changes to target data that occurred from a previous time of ingestion to the current time of ingestion, wherein changes comprises updates, inserts, and deletes. A source data change dataset is generated for the source data from the one or more source databases based on changes to the source data that occurred from the previous time of ingestion to the current time of ingestion. First differential data is generated for updates and inserts based on a comparison of the updates and the inserts in the target data change dataset and the source data change dataset. Second differential data is generated for deletes based on a join operation for deletes using the one or more target databases and the source data change dataset. The target data in the one or more target databases is selectively repaired based on the first differential data and the second differential data.

One innovative aspect of the subject matter described herein can be implemented as a non-transitory computer-readable medium storing instructions that, when executed by one or more processors of a system for intelligently repairing data, cause the system to perform operations. Example operations include receiving a transmission over a communications network from a computing device associated with the DQM system. The transmission includes an indication that source data stored in one or more source databases, which are append only, was ingested and stored as target data in one or more target databases in a materialized view at a current time of ingestion. Parity data is generated for the target data in the one or more target databases with the source data in the one or more source databases. The parity data is generated by generating a target data change dataset for the target data in the one or more target databases based on changes to target data that occurred from a previous time of ingestion to the current time of ingestion, wherein changes comprises updates, inserts, and deletes. A source data change dataset is generated for the source data from the one or more source databases based on changes to the source data that occurred from the previous time of ingestion to the current time of ingestion. First differential data is generated for updates and inserts based on a comparison of the updates and the inserts in the target data change dataset and the source data change dataset. Second differential data is generated for deletes based on a join operation for deletes using the one or more target databases and the source data change dataset. The target data in the one or more target databases is selectively repaired based on the first differential data and the second differential data.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
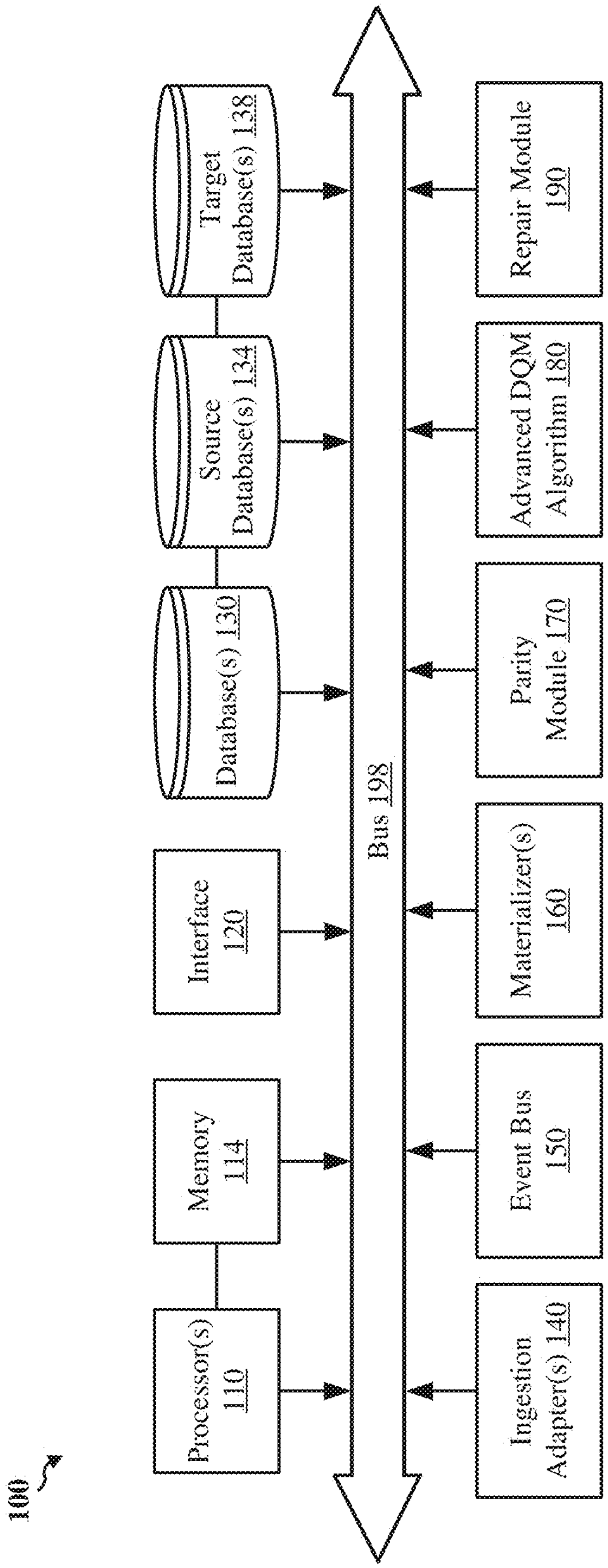
FIG. 1 illustrates a system, according to some implementations.

As described above, organizations have increasingly relied on the accuracy of their data, particularly for AI-driven platforms where the integrity of datasets is directly related to the quality of the insights and decisions that experts generate using the data. Dynamic (or "moving") data sources (e.g., news feeds, social media, etc.) increase the challenge of maintaining accurate data due to frequent errors and inconsistencies that arise during data replication procedures, such as procedures that copy the source data to a centralized repository like a DataLake. Conventional Data Quality Management (DQM) systems have difficulty identifying and correcting errors, e.g., via various parity procedures, when source data is stored in a different manner than target data. For example, source data may be stored in an append only source database, while the target database is stored a materialized target database.

For purposes of discussion herein, source data may be stored in source databases that are used for storing data related to various services, sometimes referred to as Microservices, offered by an organization (e.g., social media, financial management, expert analysis, etc.). The source databases may operate as append only, Online Transaction Processing (OLTP) databases and may constantly be subjected to operations such as inserts, updates, and deletes that are recorded in binary (or "bin") logs. The source database is append only, and accordingly the source data identifies each change made to an entry (primary key) and thus each primary key may have multiple rows. While the source databases are effective for supporting basic user interactions (e.g., in mobile and web platforms), they are not optimized for the analytical purposes of data experts. Thus, various adapters (e.g., ingestion adapters) may extract data from the bin logs, incorporate the extracted data into various event buses (e.g., Kafka-like systems), and perform one or more materialization processes that replicate the source data in one or more target databases (e.g., DataLakes) for expert analytical use. Non-limiting examples of expert analytical use include data queries for purposes of trend analysis to uncover patterns and correlations over time, user and/or customer segmentation for identifying valuable groups based on behavioral and demographic data, predictive analytics for forecasting future trends and behaviors, sentiment analysis to assess user and/or customer attitudes and feedback, and the like. The process of transitioning the source data from its original form in the source databases to its replicated form in the target databases may be referred to as an ingestion process, a materialization process, a merge process, or the like. The target data may be stored in the target databases in a materialized view, in which the target data is updated as changes occur change so that each entry (primary key) includes only a single row with the latest insert or update, or is deleted if the latest change is a delete. Once the ingestion process is complete, discrepancies in the data stored in the target databases (e.g., DataLake) are detected, such as based on one or more parity operations.

One specific, non-limiting, example, is Microservices writing data (domain events) to Outbox tables, which is published into Kafka topics and materialized in a DataLake. The Outbox table, for example, is an append only database and thus may have multiple domain events per primary key, while the DataLake snapshot table is a materialized version of the data and will have one domain event per primary key. Consequently, the contents in the Outbox table are logically the same as a DataLake snapshot table, but the actual data differs. Establishing parity between an append only source database, such as an Outbox table, and a target database with a materialized view, such as a DataLake snapshot table, after an ingestion is difficult for conventional DQM systems.

The innovative DQM system described herein can identify data discrepancies between source data and target data by comparing the source database and the target database to establish parity after ingestion. The comparison of the source database and the target database has three parts. First, changes in the target database that occurred between the current time of ingestion and a previous time are determined as a target data change dataset. The target data change dataset identifies all data that is inserted or updated in the target database between the previous and current times. The target data change dataset, however, cannot necessarily identify all data that was deleted in the target database between the previous and current times. Second, changes in the source database that occurred between the current time of ingestion and a previous time are determined as a source data change dataset. Third, differences between the target data change dataset and the source data change dataset to identify any errors. Because the target data change dataset, however, cannot necessarily identify all data that was deleted in the target database, a join operation is performed using the target database and the source data change dataset to identify any errors in the deleted data. After the final comparison, based on the resulting differentials for inserts/updates and deletes, mismatching data may be identified and repaired.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for repairing data. Implementations of the subject matter disclosed herein provide specific inventive steps describing how desired results are achieved and realize meaningful and significant improvements on existing computer functionality—that is, the performance of computer-based systems operating in the evolving technological field of data repair.

FIG. 1 shows a system 100, according to some implementations. Various aspects of the system 100 disclosed herein are generally applicable for intelligently repairing data. The system 100 includes a combination of one or more processors 110, a memory 114 coupled to the one or more processors 110, an interface 120, one or more databases 130, a source database 134, a target database 138, an ingestion adapter 140, an event bus 150, a materializer 160, a parity module 170, an advanced DQM algorithm 180, and/or a repair module 190. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device (e.g., of a user), outputting data (e.g., over the communications network) to the computing device of the user, providing a search and/or querying interface for the user, outputting search and/or query results to the computing device of the user, and the like. In some implementations, the interface 120 is used to initiate any one or more of an ingestion process, a materialization process, a replication and/or merging process, a parity process, a repair process, and the like. The interface 120 may also be used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as source data, target data, indications, timestamps, events, parity results, algorithms, differential results, ambiguities, intersection results, repair values, data objects, algorithms, weights, models, modules, engines, user information, other values, ratios, historical data, recent data, current or real-time data, files, plugins, metadata, arrays, tags, identifiers, prompts, queries, replies, feedback, insights, formats, characteristics, and/or features, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the source database 134, the target database 138, and/or another suitable physical or cloud-based data store. In some implementations, the database 130 includes a relational database capable of presenting information as data sets in tabular form and capable of manipulating the data sets using relational operators.

The one or more source databases 134 store data associated with source data, such as the source data itself, or any other suitable data related to the source data. In some implementations, the source database 134 includes one or more databases that can efficiently handle high-volume, short transactions, including data insertion, updating, and querying, and ensure data integrity and consistency across multi-user environments. In some implementations, the source database 134 includes one or more Online Transaction Processing (OLTP) databases. Example OLTP sources include MySQL, Oracle, Postgres, SQL Server, DynamoDB, S3 Files, SFTP, Domain Events, IPS, Outbox Service, or any other suitable database that can be used for managing high-volume transactions, providing advanced security features, supporting complex queries, enabling data access, securing data transfer, and the like. In various implementations, the source database 134 may be a part of or separate from the database 130 and/or the target database 138. In some instances, the source database 134 includes data stored in one or more cloud object storage services, such as one or more Amazon Web Services (AWS)-based Simple Storage Service (S3) buckets. In some implementations, all or a portion of the data is stored in a memory separate from the source database 134, such as in the database 130 and/or another suitable data store.

The one or more target (or "destination") databases 138 store data associated with target (or "destination") data, such as the target data itself, or any other suitable data related to the target data. In some implementations, the target database 138 includes one or more databases that are ideal for storing vast amounts of historical data that may be used in performing various analytics. For instance, the analytics may include the execution of complex statistical analytical queries submitted by AI expert data analysts. In some implementations, the target database 138 includes one or more DataLakes, snapshot tables, event log table, etc. The target database 138 may store multiple versions of the target data, such as versions of the target data from different times. For example, the target database 138 may include a snapshot tables or delta versions from a current time (T2), e.g., after a current ingestion run, as well as one or more snapshot tables or delta versions from previous times (T1), e.g., after a previous ingestion run. To enable fast data retrieval and effective expert analysis of large datasets, the data replicated from the source databases is represented in the DataLake in a columnar format structure. In various implementations, the target database 138 may be a part of or separate from the database 130 and/or the source database 134. In some instances, the target database 138 includes data stored in one or more cloud object storage services, such as one or more Amazon Web Services (AWS)-based Simple Storage Service (S3) buckets. In some implementations, all or a portion of the data is stored in a memory separate from the target database 138, such as in the database 130 and/or another suitable data store.

The process of transitioning the source data from its original form in the source databases 134 to its replicated form in the target databases 138 may be referred to as an ingestion process, a materialization process, a merge process, or the like. For purposes of discussion herein, the components involved in performing the ingestion process may collectively be referred to as a Unified Ingestion Platform (UIP), a data movement platform, a data integration platform, an ingestion platform, a data replication platform, or the like. The ingestion process may include extracting the source data (e.g., thousands of tables or more) from the source database 134 using one or more adapters (e.g., the ingestion adapter 140), incorporating the data into one or more event buses (e.g., the event bus 150), and performing one or more materialization processes (e.g., using the materializer 160) that replicate the source data in the target database 138 (e.g., the DataLake). In some instances, the ingestion process is referred to as a bootstrap process, such as when a complete copy of the data from the source databases 134 is replicated on the target databases 138 (e.g., to establish a baseline dataset upon which subsequent updates can be applied). Following the bootstrap process, subsequent ingestion processes may continue periodically, which may be scheduled at predefined intervals (e.g., hourly, daily), thus ensuring that the target databases 138 remain up-to-date with the latest changes recorded in the source databases 134. By continuously integrating updates from the source databases 134, relevant data that can be used for analytical processing is maintained on the target databases 138.

In some implementations, the event bus 150 incorporates one or more aspects of change data capture (CDC) to facilitate real-time data integration from the OLTP source databases 134. Specifically, CDC events may be extracted based on the changes captured from the source database 134 and serialized into a (e.g., UIP) format that includes important information about the associated change, such as a timestamp associated with the change and data before and after the change. The events may be published to the event bus 150. Thereafter, the data may be transferred from the event bus 150 to one or more pipelines each including one or more materializers 160. In general, the materializer 160 retrieves updates and changes since a most recent materialization checkpoint to ensure that the target database 138 (e.g., the DataLake) is synchronized with a most recent state of the source data. One example data pipeline may be for real-time processing, where the data is transferred from the event bus 150 to a materializer 160 (e.g., a streaming materializer) and then to a particular target database 138, such as a clean DataLake that stores target data in delta tables, snapshot table, event log table, etc., (e.g., such as to allow immediate access with relatively high data integrity). Another example data pipeline may be for cost-effective large-scale analysis and historical reporting, where the data is batched from the event bus 150 to an object storage service (e.g., one or more Amazon S3 buckets), processed by a materializer 160 (e.g., a batch materializer), and stored in a raw DataLake (e.g., in parquet format in hive tables).

The parity module 170 may be used to receive a transmission over a communications network from a computing device associated with the DQM system. The transmission may include an indication that an ingestion process has completed—that is, that source data stored in the one or more source databases 134 was ingested (e.g., by the ingestion adapter 140, event bus 150, and materializer 160) and stored as target data in the one or more target databases 138. In some instances, the transmission is received from the target database 138, the materializer 160, or another suitable component for informing the parity module 170 that the ingestion process is complete. The indication may also include one or more times associated with the present (or most recent) ingestion process, such as a time that the ingestion process started, a duration of the ingestion process, a time that the ingestion process was completed, a scheduled time of a future ingestion process, a previous time of ingestion, and the like. For purposes of discussion herein, the "time of ingestion" may refer to the time that the present ingestion process started, which may also be referred to as a start time of the materializer 160. In some instances, the indication includes one or more times associated with multiple ingestion processes. For instance, as further described below, the parity module 170 may generate parity data based on changes in the target data and the source data occurring before the most recent time of ingestion (e.g., before T2) and after a previous time of ingestion (e.g., after T1). The indication may also include information (such as timestamps) related to events or changes that occurred in association with the source data. In some instances, times of the changes are communicated using change data capture (CDC) timestamps.

The parity module 170 may also be used in conjunction with the advanced DQM algorithm 180 to compare the target data with the source data to generate parity results based on changes occurring before the current time of ingestion (e.g., and after a previous time of ingestion). It will be understood that parity results refer to the results of a parity job or another suitable quality assurance process performed after the source data is ingested into the target database 138. For instance, the process may involve running queries on the original data source (e.g., the source database 134) and the destination database (e.g., the target database 138) and comparing the results (e.g., using a suitable diff algorithm and/or tool), where the objective is to identify discrepancies between the sets of data. In some aspects, the parity job adds parity bits to the source data to maintain an even or odd number of 1 s, allowing for error detection by recalculating the parity on the target data, where a discrepancy between the original and recalculated parity indicates a parity error. For instance, the parity results may include a first differential result may be generated for updated and inserted data based on a comparison of changes in the target data and the source data, and a second differential result may be generated for deleted data based on a join operation using the target database and changes made in the source data, and the differential results may be used to identify data discrepancies and/or changes for selective repair (or non-repair).

Specifically, upon receiving the indication that the ingestion process has completed, the parity module 170 in conjunction with the advanced DQM algorithm 180 may first determine a target data change dataset based on changes in the target database that occurred between the current time of ingestion (T2) and a previous time (T1). The target data change dataset, for example, may be generated by determining a previous data change dataset based on rows from a previous target data version, e.g., a snapshot table from previous time T1, with a CDC timestamp after a base time (T0). The previous data change dataset will contain all updated and inserted rows with a CDC between T0 and T1, but will not contain rows deleted between T0 and T1 because these rows are deleted in the previous target data version. Similarly, a current data change dataset is generated based on the current target data version, e.g., a snapshot table from the current time T2, with a CDC timestamp after the base time (T0). The current data change dataset will contain all updated and inserted rows with a CDC between T0 and T2, will not contain rows between T0 and T2 because these rows are deleted in the current target data version. The target data change dataset is then generated based on the difference between the previous data change dataset and the current data change dataset. Rows that were inserted or updated between T0 and T1, but were not changed between T1 and T2 will be present in both the previous data change dataset and the current data change dataset, and accordingly, the difference will null these rows. The target data change dataset identifies all data that is inserted or updated in the target database between the previous and current times, i.e., with a CDC time between T1 and T2. The target data change dataset, however, cannot necessarily identify all rows that were deleted in the target database between the previous and current times, i.e., with a CDC time between T1 and T2. For example, any rows deleted with a CDC time between T0 and T1 will be absent in both the previous data change dataset and the current data change dataset, and accordingly, will be absent in the difference between the previous data change dataset and the current data change dataset. If a row is deleted with a CDC time between T1 and T2, and if the row was inserted or updated with a CDC time between T0 and T1, the row will be present in the previous data change dataset but will be absent in the current data change dataset, and accordingly, the difference between the previous data change dataset and the current data change dataset will identify the deleted row. However, if a row is deleted with a CDC time between T1 and T2 and the row was not inserted or updated with a CDC time between T0 and T1, the row will be absent in both the previous data change dataset and the current data change dataset, and accordingly, will be absent in the difference between the previous data change dataset and the current data change dataset. Accordingly, the target data change dataset may identify only a portion of the data that was deleted between the previous and current times, i.e., with a CDC time between T1 and T2.

The parity module 170 in conjunction with the advanced DQM algorithm 180 may secondly determine a source data change dataset based on changes in the source database that occurred between the current time of ingestion (T2) and a previous time (T1). The source data change dataset, for example, may be generated by ordering, for each primary key, all changes (including all inserts, updates, and deletes) in the source data that occurred between the previous and current times of ingestion, e.g., with CDC times between T1 and T2. The latest change for each primary key is then selected to form the source data change dataset.

The parity module 170 in conjunction with the advanced DQM algorithm 180 may thirdly determine differences between the target data change dataset and the source data change dataset to identify any errors. For example, a first differential data may be generated based on a comparison of the updates and the inserts present in the target data change dataset and the source data change dataset. A second differential data may be generated based on a join operation for deletes using the target database and the source data change dataset. Because the target data change dataset does not necessarily identify all data that was deleted in the target database, the join operation using the target database is used to identify any errors in the deleted data. For example, in one implementation, the second differential data may be generated by comparing the deletes present in the target data change dataset and the source data change dataset, e.g., any deletes identified in the target data change dataset must match deletes in the source data change dataset. Any deleted rows that are missing from the target data change dataset can be identified in a delete dataset generated by comparing the deletes in the source data change dataset to the deletes in the target data change dataset. The join operation can then be performed with the target database and the delete dataset. In another implementation, the second differential data may be generated using a join operation with the target database and the source data change dataset, without performing a comparison of the deletes present in the target data change dataset and the source data change dataset. If all deleted rows are properly ingested, the join operation with the target database will result in zero rows, but if an error occurs, the row(s) will be identified from the join operation.

Upon completing the parity jobs, the parity module 170 in conjunction with the advanced DQM algorithm 180 identifies any errors and the row(s) with the error.

Upon generating the parity results, e.g., the first differential data and the second differential data, the repair module 190 may be used to selectively repair changes in one or more rows accordingly. Specifically, the repair module 190 refrains from repairing data if no errors occurred and repairs data if errors are identified. In some implementations, the repair module 190 selective repairs the data by automatically repairing data associated with errors identified in the first differential data and the second differential data as having an error. In other words, in such implementations, the repair module 190 automatically repairs data discrepancies (e.g., without further processing) based on changes occurring before the time of ingestion that were flagged as data discrepancies due to not being present or differing on the source database 134.

The ingestion adapter 140, the event bus 150, the materializer 160, the parity module 170, the advanced DQM algorithm 180, and/or the repair module 190 are implemented in software, hardware, or a combination thereof. In some implementations, any one or more of the ingestion adapter 140, the event bus 150, the materializer 160, the parity module 170, the advanced DQM algorithm 180, or the repair module 190 is embodied in instructions that, when executed by the processor 110, cause the system 100 to perform operations. In various implementations, the instructions of one or more of said components, the interface 120, the source database 134, and/or target database 138, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples related to intelligently repairing data are described with reference to the system 100, other suitable system configurations may be used.

Figure 2:
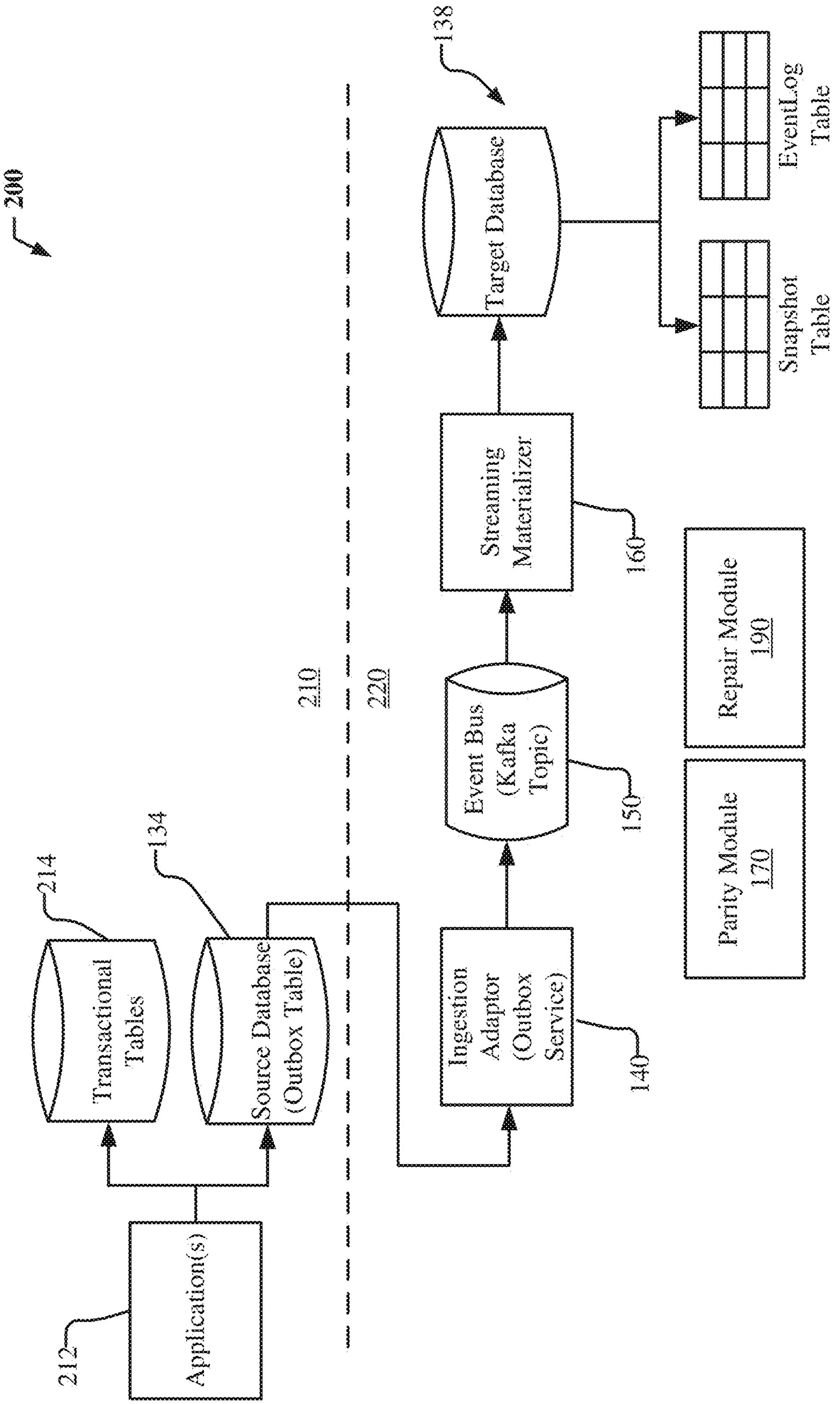
FIG. 2 illustrates a high-level architecture for data ingestion.

FIG. 2 illustrates a high-level architecture 200 for data ingestion. In various implementations, the architecture 200 incorporates one or more (or all) aspects of the system 100 including the aspects of the Data Quality Management (DQM) system such as the parity module 170. In some implementations, various aspects described with respect to FIG. 1 are not incorporated, such as the source database 134, the target database 138, the ingestion adapter 140, the event bus 150, and/or the materializer 160.

As illustrated, the architecture 200 may be divided between the source application 210 and the data platform 220. The source application 210 includes one or more applications 212, which, for example, may be in a microservice architecture. Whenever an event occurs, within the one or more applications 212, the event is written to one or more source databases, such as transactional tables 214 and the source database 134. The source database 134, for example, is an append only database, such as an Outbox table.

The data from the source database 134 is published to the event bus 150 by the ingestion adapter 140 in the data platform 220, which incorporate one or more aspects of change data capture (CDC) to facilitate real-time data integration from the source databases 134. The ingestion adapter 140, which, for example, may be an Outbox service, extracts events based on the changes captured from the source database 134 and serializes them into a format that includes information about the associated change, such as a timestamp associated with the change and the type of change, e.g., insert, update, or delete. The events are published to the event bus, which, for example, may be a Kafka-like system. Thereafter, the data may be transferred from the event bus 150 to one or more pipelines each including one or more materializers 160. The materializer 160 retrieve updates and changes since a most recent materialization checkpoint to ensure that the target database is synchronized with a most recent state of the source data. One example data pipeline may be for real-time processing, where the data is transferred from the event bus 150 to a materializer 160 (e.g., a streaming materializer) and then to a particular target database 138, such as a clean DataLake, that stores target data in the snapshot table and event log table. The target database 138, such as the snapshot table, stores the events in materialized form, e.g., as the state of the data at a particular point in time, with each primary key represented by a single row.

The parity module 170 and repair module 190 are included in the data platform 220. The parity module 170 ensures that the target data stored in the target database 138, e.g., in the snapshot table, correctly represents the source data from the source database 134, and if not, the repair module 190 corrects the target data.

As discussed above, data is held in the source database 134 and the target database 138 differently. For example, the source database 134 is an append only OLTP database, that contains all domain events, including inserts, updates, and deletes, published by the one or more applications 210. The source database 134, for example, may include multiple changes for a given primary key that have occurred for a period of time, e.g., over several days. The target database 138, on the other hand, is a materialized table for all domain events and accordingly, will only include a single row for a given primary key. By way of example, Table 1, below, provides an illustration of source data and target data for the same primary keys (PK) as stored in the source database 134 and target database 138, respectively.

TABLE 1

| Source Data | Target Data |
|---|---|
| PK1 Insert | PK1 <col. values> |
| PK1 Update1 | PK2 <col. values> |
| PK1 Update2 | |
| . . . | |
| PK1 Update 10 | |
| PK2 Update1 | |
| PK3 Delete | |

Figure 3:
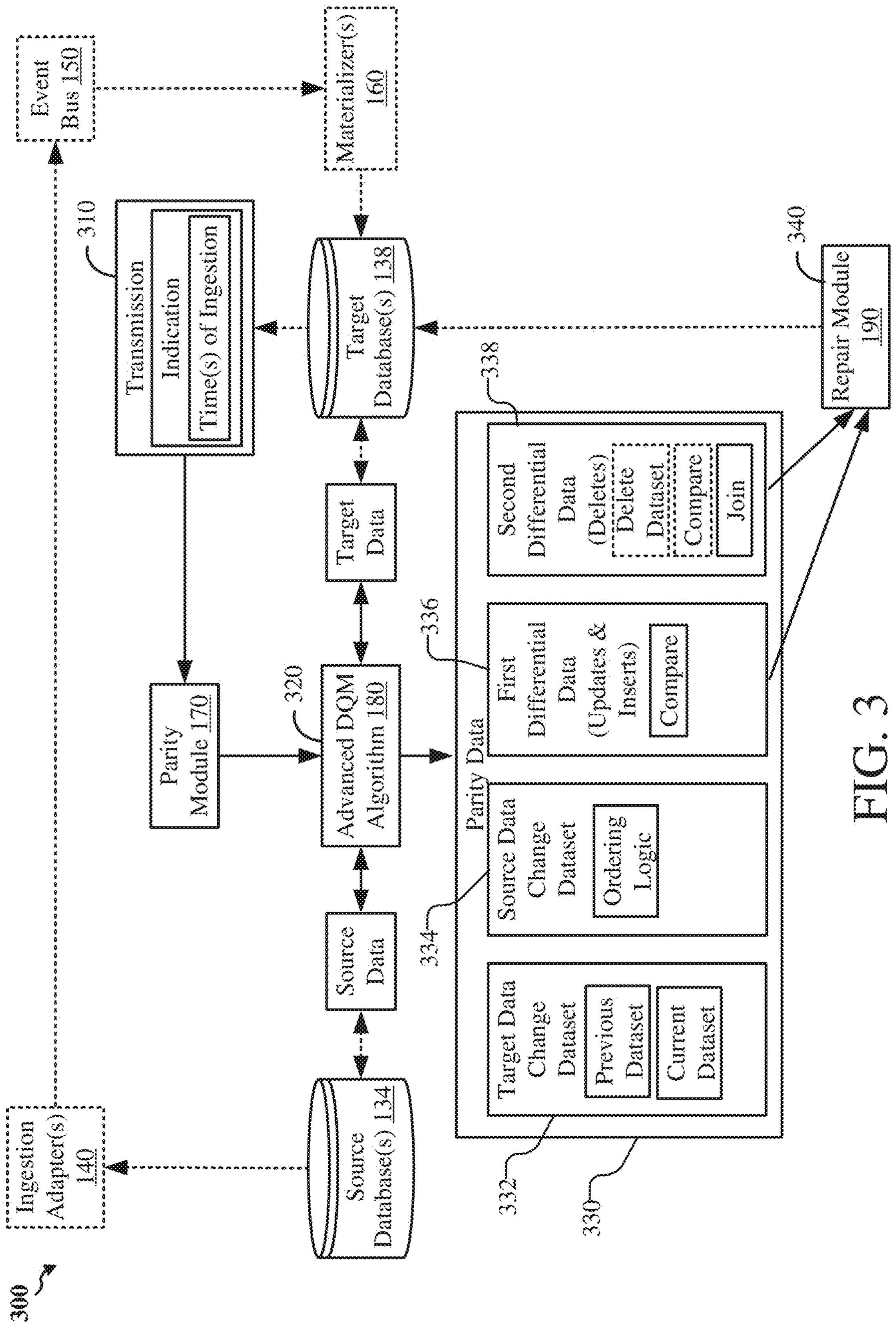
FIG. 3 illustrates a high-level overview of an example process flow employed by a system for Data Quality Management, according to some implementations.

FIG. 3 shows a high-level overview of an example process flow 300 employed by a system, according to some implementations, during which parity of data detected and selected data is repaired as necessary. In various implementations, the system is a Data Quality Management (DQM) system and incorporates one or more (or all) aspects of the system 100. In some implementations, various aspects are described with respect to FIGS. 1 and 2 are not incorporated, such as the ingestion adapter 140, the event bus 150, and/or the materializer 160.

At block 310, a transmission is received (e.g., by the parity module 170) over a communications network from a computing device associated with the DQM system. The computing device may be the target database 138 or be at least communicably coupled to the target database 138. The transmission may include an indication that source data stored in the one or more source databases 134 was ingested and stored as target data in the one or more target databases 138 at a time of ingestion. In some implementations, the source data is ingested as part of a data ingestion process for replicating source data as target data. In some aspects, the data ingestion process includes replicating data stored in the one or more source databases 134 on the one or more target databases 138 and may be performed by one or more ingestion adapters (e.g., the ingestion adapter 140), one or more event buses (e.g., the event bus 150), and one or more materializers (e.g., the materializer 160), all of which components may or may not be included in the DQM system. In some instances, the one or more source databases 134 include at least one append only database, which may be an Online Transaction Processing (OLTP) database, such as an Outbox table. In other instances, the one or more target databases 138 include at least one materialized database, such as a DataLake snapshot table.

At block 320, the target data is compared (e.g., by the parity module 170) with the source data using an advanced DQM algorithm (e.g., the advanced DQM algorithm 180). The advanced DQM algorithm may include generating parity data 330 for the target data in the one or more target databases 138 and the source data in the one or more source databases 134. The parity data 330, for example, may include a target data change dataset 332, a source data change dataset 334, first differential data 336 for updates and inserts, and second differential data 338 for deletes.

The target data change dataset 332, for example, may be generated for the target data in the one or more target databases 138 based on changes to the target data that occurred from a previous time of ingestion to the current time of ingestion. Each row in the target data in the one or more target databases 138 have a change data capture (CDC) timestamp for the change, e.g., update or insert, indicating when the change occurred. Any rows with a delete change are deleted from the target data in the one or more target databases 138. The changes to the target data that occurred from a previous time and to the current time may be determined using the CDC timestamp. The one or more target databases 138 store multiple versions of the target data for different ingestion times. For example, in an initial ingestion run, at a base time T0, an initial snapshot.0 of the target data may be created, while in a previous ingestion run at time T1 a previous snapshot.1 is created, where the base time T0 prior to the previous time T1. Additionally, in the current ingestion run, at time T2, the current (i.e., latest) snapshot.2 is created, where the previous time T1 is prior to the current time T2.

A previous data change dataset is generated based on the previous target data, e.g., snapshot.1 from time T1, e.g., by selecting all rows with a CDC timestamp greater than T0. The previous data change dataset, thus, contains all updated and inserted rows from the target data with a CDC between T0 and T1, but does not contain any deleted rows with a CDC between T0 and T1 because these rows are deleted from the previous target data, e.g., snapshot.1 from time T1. Similarly, a current data change dataset is generated based on the current target data, e.g., snapshot.2 from time T2, e.g., by selecting all rows with a CDC timestamp greater than T0. The current data change dataset, thus, contains all updated and inserted rows from the target data with a CDC between T0 and T2, but does not contain deleted rows with a CDC between T0 and T2, because these rows are deleted from the current target data, e.g., snapshot.2 from time T2.

The target data change dataset 332 is then produced based on the difference between the previous data change dataset and the current data change dataset. Any rows that were changed, e.g., inserted or updated, between T0 and T1, but not changed between T1 and T2, will be present in both the previous data change dataset and the current data change dataset, and will be nulled by the difference between the previous data change dataset and the current data change dataset. Thus, the target data change dataset 332 includes only changed rows, i.e., inserted or updated rows, with a CDC between T1 and T2. Inserted rows with a CDC between T1 and T2 will be present in the current data change dataset, but will not be present the previous data change dataset and, thus, the target data change dataset 332 will identify any inserted rows with a CDC between T1 and T2 as the additional rows from the current target data, e.g., snapshot.2 from time T2. Updated rows with a CDC between T1 and T2 will be present in the current data change changeset, but may likewise be present in the previous data change dataset, e.g., if the row was inserted or had a previous update with a CDC between T0 and T1. If the row is present in the previous data change dataset, the target data change dataset 332 will identify any updated rows with a CDC between T1 and T2 as a difference in the rows in the current target data, e.g., snapshot.2 from time T2 and the previous target data, e.g., snapshot.1 from time T1. As noted above, deleted rows are not included in the previous data change dataset and the current data change dataset. Thus, any rows that were deleted between T0 and T1 are not present in either the previous data change dataset or the current data change dataset. Rows that were deleted between T1 and T2 are not present in the current data change changeset, but may be present in the previous data change dataset, e.g., if the row was inserted or had a previous update with a CDC between T0 and T1. Thus, if the row is present in the previous data change dataset, the target data change dataset 332 will identify any deleted rows with a CDC between T1 and T2 as the additional rows from the previous target data, e.g., snapshot.1 from time T1. If a row is deleted between T1 and T2, it will be present in the previous target data version and should not be present in the current target data version. However, if the row deleted between T1 and T2 was not inserted or updated between T0 and T1, then the row will not be present in the previous data change dataset (because there was no change), and will not be present in the current data change dataset (because the row was deleted), and accordingly, the target data change dataset 332 will not identify these deleted rows. Accordingly, an inner join for the deletes from the target data change dataset 332 with the current dataset version may be used to ensure that it is empty.

The source data change dataset 334, for example, may be generated for the source data in the one or more source databases 134 based on changes in the data that occurred between the previous time and the current time. The source data, for example, may include an "entityChangeAction" field in the event header, which identifies the change for given row, i.e., whether the change is an insert, update, or delete, along with a CDC timestamp. All data in the one or more source databases 134 with changes that occurred from the previous time to the current time, e.g., with a CDC time stamp t, where $T1 \leq t \leq T2$. Ordering logic is used to order all the resulting change entries and select only the latest change for each primary key, based on the time stamp associated with the change. For example, if a primary key had multiple change entries between T1 and T2, including inserts and updates followed by a delete, the source data change dataset 334 will include only the delete change for that primary key. On the other hand, if a primary key had multiple change entries between T1 and T2, including a delete followed by an insert, the source data change dataset 334 will include only the insert change for that primary key. Likewise, for a primary key with a delete followed by an insert then an update between T1 and T2, the source data change dataset 334 will include only the update. If a primary key includes only a single change between T1 and T2, the source data change dataset 334 will include that change.

The first differential data 336 may be generated based on a comparison of the updates and the inserts present in the target data change dataset 332 and the source data change dataset 334. It should be understood that updates in the target data change dataset 332 and the source data change dataset 334 may be compared separately from the inserts in the target data change dataset 332 and the source data change dataset 334, but the resulting differential data will be equivalent to a comparison of both the updates and inserts in the target data change dataset 332 and the source data change dataset 334 together. Any inserts identified in the target data change dataset 332, e.g., as the additional rows from the target data ingested at time T1 (snapshot.2), should be an exact match with inserts identified in the source data change dataset 334. Similarly, any updates identified in the target data change dataset 332 should match the updates identified in the source data change dataset 334, which is the latest update.

The second differential data 338 may be generated based on a join operation for deletes using the one or more target databases 138 and the source data change dataset 334. Any deletes that are present in the source data change dataset 334 should be deleted from the one or more target databases 138. To verify that deletes in the source data change dataset 334 have been correctly ingested by the one or more target databases 138, the absence of that row from the one or more target databases 138 needs to be confirmed.

In one implementation, the second differential data 338 may be generated based on a comparison of the deletes present in the target data change dataset 332 and the source data change dataset 334. As noted above, the target data change dataset 332 will identify any deleted rows with a CDC between T1 and T2, if those rows had inserts or changes in the previous data change dataset (between T0 and T1), because these rows are present in the previous data change dataset, but absent in the current data change dataset. Any deletes that are identified in the target data change dataset 332 should match deletes identified in the source data change dataset 334. If any deleted rows do not match, then an error occurred.

However, the target data change dataset 332 may not identify all deleted rows. For example, the target data change dataset 332 will not identify deleted rows with a CDC between T1 and T2 if those rows did not also have a change in the previous data change dataset (between T0 and T1), because those rows are not present in the previous data change dataset (because there was no change), and are not present in the current data change dataset (because the row was deleted). Accordingly, the number of deleted rows in the source data change dataset 334 may be larger than the number of deleted rows in the target data change dataset 332, because the source data change dataset 334 captures all deletes with a CDC between T1 and T2. Accordingly, prior to performing the join operation, a delete dataset is first generated by comparing the deletes in the source data change dataset 334 to the deletes in the target data change dataset 332, which identifies deleted rows that are not included in the target data change dataset 332. The join operation for the deletes then uses the one or more target databases 138, e.g., the current (i.e., latest) snapshot.2, and the delete dataset that was generated using the source data change dataset 334 and the target data change dataset 332. If all deleted rows are properly absent in the one or more target databases 138, the join operation with the delete dataset will produce zero rows. If the row count from the join operation is greater than zero, then an error occurred, and the rows identified from the join operation correspond to the deletes that were not properly ingested by the one or more target databases 138. Accordingly, if the comparison of the deletes present in the target data change dataset 332 and the source data change dataset 334 does not match, or if the row count from the join operation is greater than zero, then an error occurred and the deleted rows that were not properly ingested by the one or more target databases 138 are identified.

In one implementation, a join operation for the deletes in the one or more target databases 138, e.g., the current (i.e., latest) snapshot.2, and the source data change dataset 334 may be used, thereby eliminating the need to perform a comparison of the deletes present in the target data change dataset 332 and the source data change dataset 334 and generating the delete dataset prior to performing the join operation. If all deleted rows from the source data change dataset 334 are properly deleted in the one or more target databases 138, the join operation for the one or more target databases 138 and the source data change dataset 334 will produce zero rows. If the row count from the join operation is greater than zero, then an error occurred, and the rows identified from the join operation correspond to the deletes that were not properly ingested by the one or more target databases 138.

At block 340, ones of the changes are selectively repaired by the repair module 190 based on the results from the first differential data 336 and the second differential data 338. In some implementations, the selective repairing includes identifying, based on the differential results, the data that was not properly ingested and repairing the data.

Figure 4:
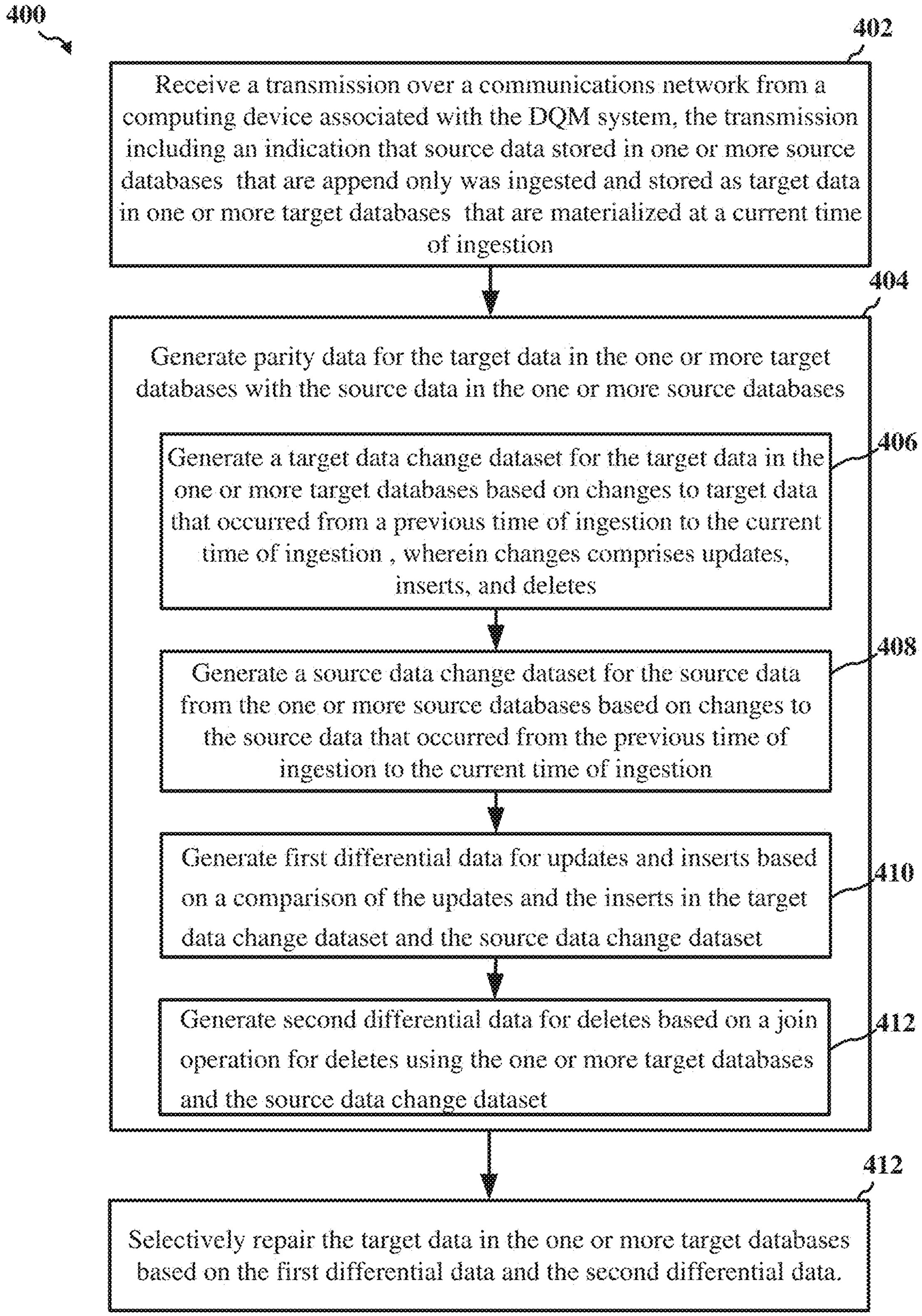
FIG. 4 shows an illustrative flowchart depicting an example method for intelligently repairing data, according to some implementations.

FIG. 4 shows an illustrative flowchart depicting an example method 400 for intelligently repairing data by one or more processors of a data quality management (DQM) system, as discussed herein. The method 400 is described as a computer-implemented method, e.g., performed by the system 100 illustrated in FIG. 1, which may employ the architecture 200 and process flow 300 illustrated in FIGS. 2 and 3, according to some implementations. Various operations of method 400 may sometimes refer to one or more of FIGS. 1-3, for the sake of example, but it should be understood that operations are not specifically limited to the components referred and that other suitable components may be used to perform the various operations discussed herein.

At 402, the system 100 receives a transmission over a communications network from a computing device associated with the DQM system, the transmission including an indication that source data stored in one or more source databases, which are append only, was ingested and stored as target data in one or more target databases in a materialized view at a current time of ingestion, e.g., as discussed in relation to parity module 170 and transmission at block 310 in FIG. 3. In some implementations, for example, the source data may be ingested as part of a data ingestion process for replicating data stored in the one or more source databases on the one or more target databases, e.g., as discussed in relation to FIG. 2 and FIG. 3. The one or more source databases, for example, may include an outbox table for at least one Online Transaction Processing (OLTP) database, such as source database 134. The one or more target databases, for example, may be a snapshot table for a DataLake.

At 404, the system 100 generates parity data for the target data in the one or more target databases with the source data in the one or more source databases, e.g., as discussed in relation to parity module 170 employing an advanced DQM algorithm 180 at block 320 in FIG. 3.

At 406, the parity data may be generated by the system 100 by generating a target data change dataset for the target data in the one or more target databases based on changes to target data that occurred from a previous time of ingestion to the current time of ingestion, where changes include updates, inserts, and deletes, e.g., as discussed in relation to the target data change dataset 332 in the parity data 330 in FIG. 3.

At 406, the parity data may be generated by the system 100 by generating a source data change dataset for the source data from the one or more source databases based on changes to the source data that occurred from the previous time of ingestion to the current time of ingestion, e.g., as discussed in relation to the source data change dataset 334 in the parity data 330 in FIG. 3.

At 408, the parity data may be generated by the system 100 by generating first differential data for updates and inserts based on a comparison of the updates and the inserts in the target data change dataset and the source data change dataset, e.g., as discussed in relation to the first differential data 336 in the parity data 330 in FIG. 3. In some implementations, the first differential data identifies any updates or inserts in the target data and the source data that do not exactly match.

At 410, the parity data may be generated by the system 100 by generating second differential data for deletes based on a join operation for deletes using the one or more target databases and the source data change dataset, e.g., as discussed in relation to the second differential data 338 in the parity data 330 in FIG. 3. In some implementations, the second differential data identifies any deletes in the source data that remains in the one or more target databases based on non-empty results from the join operation.

At 412, the system 100 selectively repairs the target data in the one or more target databases based on the first differential data and the second differential data, e.g., as discussed in relation to repair module 190 in FIG. 3. In some implementations, selectively repairing the target data in the one or more target databases based on the first differential data and the second differential data includes automatically repairing the target data in response to identified discrepancies between the target data and the source data.

In some implementations, the system 100 may generate the target data change dataset for the target data in the one or more target databases based on changes to the target data that occurred from the previous time of ingestion to the current time of ingestion by generating a previous data change dataset for the target data based on changes to the target data that occurred from a base time of ingestion to the previous time of ingestion, wherein the base time of ingestion is before the previous time of ingestion, e.g., as discussed in relation to the previous data change dataset in the target data change dataset 332 in FIG. 3. Additionally, a current data change dataset is generated for the target data based on changes to the target data that occurred from the base time of ingestion to the current time of ingestion, e.g., as discussed in relation to the current data change dataset in the target data change dataset 332 in FIG. 3. The target data change dataset is generated based on differences between the previous data change dataset and the current data change dataset, e.g., as discussed in relation to the target data change dataset 332 in FIG. 3. By way of example, the previous data change dataset may be generated by selecting rows of data from the target data from the previous time of ingestion with changes having a change data capture (CDC) timestamp after the base time of ingestion, and the current data change dataset may be generated by selecting rows of data from the target data from the current time of ingestion with changes having the CDC timestamp after the base time of ingestion.

In some implementations, the system 100 may generate the source data change dataset for the source data from the one or more source databases based on changes to the source data that occurred from the previous time of ingestion to the current time of ingestion by obtaining source data from the one or more source databases identified with changes that occurred from the previous time of ingestion to the current time of ingestion using change data capture (CDC) timestamps, e.g., as discussed in relation to the ordering logic in the source data change dataset 334 in FIG. 3. The source data change dataset is generated by selecting only a latest change for each primary key in the obtained source data, e.g., as discussed in relation to the ordering logic in the source data change dataset 334 in FIG. 3.

In some implementations, the system 100 may generate the second differential data for deletes based on the join operation for deletes using the one or more target databases and the source data change dataset by generating a delete dataset using the source data change dataset based on a comparison of deletes in the source data change dataset and deletes in the target data change dataset and the join operation is performed with the delete dataset and the one or more target databases, e.g., as discussed in relation to the delete dataset and the join operation in the second differential data 338 in FIG. 3. In some implementations, the second differential data for deletes based on the join operation for deletes using the one or more target databases and the source data change dataset may further include comparing deletes in the target data change dataset and the source data change dataset, e.g., as discussed in relation to the compare block in the second differential data 338 in FIG. 3.

In some implementations, the system 100 may generate the second differential data for deletes based on the join operation for deletes using the one or more target databases and the source data change dataset by performing the joining operation with the one or more target databases and the source data change dataset, e.g., as discussed in relation to the join operation in the second differential data 338 in FIG. 3.

As used herein, a phrase referring to “at least one of” a list of items refers to any combination of those items, including single members. As an example, “at least one of: a, b, or c” is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for intelligently repairing data, the method performed by one or more processors of a data quality management (DQM) system, the method comprising:

receiving a transmission over a communications network from a computing device associated with the DQM system, the transmission including an indication that source data stored in one or more source databases, which are append only, was ingested and stored as target data in one or more target databases in a materialized view at a current time of ingestion;

generating parity data for the target data in the one or more target databases with the source data in the one or more source databases, comprising:

generating a target data change dataset for the target data in the one or more target databases based on changes to target data that occurred from a previous time of ingestion to the current time of ingestion, wherein changes comprise updates, inserts, and deletes;

generating a source data change dataset for the source data from the one or more source databases based on changes to the source data that occurred from the previous time of ingestion to the current time of ingestion;

generating first differential data for updates and inserts based on a comparison of the updates and the inserts in the target data change dataset and the source data change dataset;

generating second differential data for deletes based on a join operation for deletes using the one or more target databases and the source data change dataset; and selectively repairing the target data in the one or more target databases based on the first differential data and the second differential data.

2. The method of claim 1, wherein:

the source data is ingested as part of a data ingestion process for replicating data stored in the one or more source databases on the one or more target databases;

the one or more source databases include an outbox table for at least one Online Transaction Processing (OLTP) database, and the one or more target databases comprise a snapshot table for a DataLake.

3. The method of claim 1, wherein generating the target data change dataset for the target data in the one or more target databases based on changes to the target data that occurred from the previous time of ingestion to the current time of ingestion comprises:

generating a previous data change dataset for the target data based on changes to the target data that occurred from a base time of ingestion to the previous time of ingestion, wherein the base time of ingestion is before the previous time of ingestion;

generating a current data change dataset for the target data based on changes to the target data that occurred from the base time of ingestion to the current time of ingestion; and generating the target data change dataset based on differences between the previous data change dataset and the current data change dataset.

4. The method of claim 3, wherein generating the previous data change dataset comprises selecting rows of data from the target data from the previous time of ingestion with changes having a change data capture (CDC) timestamp after the base time of ingestion, and generating the current data change dataset comprises selecting rows of data from the target data from the current time of ingestion with changes having the CDC timestamp after the base time of ingestion.

5. The method of claim 1, wherein generating the source data change dataset for the source data from the one or more source databases based on changes to the source data that occurred from the previous time of ingestion to the current time of ingestion comprises:

obtaining source data from the one or more source databases identified with changes that occurred from the previous time of ingestion to the current time of ingestion using change data capture (CDC) timestamps; and selecting only a latest change for each primary key in the obtained source data to generate the source data change dataset.

6. The method of claim 1, wherein generating the second differential data for deletes based on the join operation for deletes using the one or more target databases and the source data change dataset comprises:

generating a delete dataset using the source data change dataset based on a comparison of deletes in the source data change dataset and deletes in the target data change dataset;

wherein the join operation is with the delete dataset and the one or more target databases.

7. The method of claim 6, wherein generating the second differential data for deletes based on the join operation for deletes using the one or more target databases and the source data change dataset further comprises:

comparing deletes in the target data change dataset and the source data change dataset.

8. The method of claim 1, wherein generating the second differential data for deletes based on the join operation for deletes using the one or more target databases and the source data change dataset comprises performing the join operation with the one or more target databases and the source data change dataset.

9. The method of claim 1, wherein the first differential data identifies any updates or inserts in the target data and the source data that do not exactly match.

10. The method of claim 1, wherein the second differential data identifies any deletes in the source data that remain in the one or more target databases based on non-empty results from the join operation.

11. The method of claim 1, wherein selectively repairing the target data in the one or more target databases based on the first differential data and the second differential data comprises automatically repairing the target data in response to identified discrepancies between the target data and the source data.

12. A system for intelligently repairing data, the system comprising:

one or more processors of a data quality management (DQM) system;

at least one memory coupled to the one or more processors and storing instructions that, when executed by the one or more processors, cause the system to perform operations comprising:

receiving a transmission over a communications network from a computing device associated with the DQM system, the transmission including an indication that source data stored in one or more source databases, which are append only, was ingested and stored as target data in one or more target databases in a materialized view at a current time of ingestion;

generating parity data for the target data in the one or more target databases with the source data in the one or more source databases, comprising:

generating a target data change dataset for the target data in the one or more target databases based on changes to target data that occurred from a previous time of ingestion to the current time of ingestion, wherein changes comprise updates, inserts, and deletes;

generating a source data change dataset for the source data from the one or more source databases based on changes to the source data that occurred from the previous time of ingestion to the current time of ingestion;

generating first differential data for updates and inserts based on a comparison of the updates and the inserts in the target data change dataset and the source data change dataset;

generating second differential data for deletes based on a join operation for deletes using the one or more target databases and the source data change dataset; and selectively repairing the target data in the one or more target databases based on the first differential data and the second differential data.

13. The system of claim 12, wherein:

the source data is ingested as part of a data ingestion process for replicating data stored in the one or more source databases on the one or more target databases;

the one or more source databases include an outbox table for at least one Online Transaction Processing (OLTP) database, and the one or more target databases comprise a snapshot table for a DataLake.

14. The system of claim 12, wherein the system performs generating the target data change dataset for the target data in the one or more target databases based on changes to the target data that occurred from the previous time of ingestion to the current time of ingestion by being caused to perform operations comprising:

generating a previous data change dataset for the target data based on changes to the target data that occurred from a base time of ingestion to the previous time of ingestion, wherein the base time of ingestion is before the previous time of ingestion;

generating a current data change dataset for the target data based on changes to the target data that occurred from the base time of ingestion to the current time of ingestion; and generating the target data change dataset based on differences between the previous data change dataset and the current data change dataset.

15. The system of claim 14, wherein the system performs generating the previous data change dataset by being caused to perform operations comprising selecting rows of data from the target data from the previous time of ingestion with changes having a change data capture (CDC) timestamp after the base time of ingestion, and generating the current data change dataset comprises selecting rows of data from the target data from the current time of ingestion with changes having the CDC timestamp after the base time of ingestion.

16. The system of claim 12, wherein the system performs generating the source data change dataset for the source data from the one or more source databases based on changes to the source data that occurred from the previous time of ingestion to the current time of ingestion by being caused to perform operations comprising:

obtaining source data from the one or more source databases identified with changes that occurred from the previous time of ingestion to the current time of ingestion using change data capture (CDC) timestamps; and selecting only a latest change for each primary key in the obtained source data to generate the source data change dataset.

17. The system of claim 12, wherein the system performs generating the second differential data for deletes based on the join operation for deletes using the one or more target databases and the source data change dataset by being caused to perform operations comprising:

generating a delete dataset using the source data change dataset based on a comparison of deletes in the source data change dataset and deletes in the target data change dataset;

wherein the join operation is with the delete dataset and the one or more target databases.

18. The system of claim 17, wherein the system performs generating the second differential data for deletes based on the join operation for deletes using the one or more target databases and the source data change dataset by being caused to perform operations further comprising:

comparing deletes in the target data change dataset and the source data change dataset.

19. The system of claim 12, wherein the system performs generating the second differential data for deletes based on the join operation for deletes using the one or more target databases and the source data change dataset by being caused to perform operations comprising performing the join operation with the one or more target databases and the source data change dataset.

20. The system of claim 12, wherein the first differential data identifies any updates or inserts in the target data and the source data that do not exactly match.

21. The system of claim 12, wherein the second differential data identifies any deletes in the source data that remain in the one or more target databases based on non-empty results from the join operation.

22. The system of claim 12, wherein the system performs selectively repairing the target data in the one or more target databases based on the first differential data and the second differential data by being caused to perform operations comprising automatically repairing the target data in response to identified discrepancies between the target data and the source data.

* * * * *